(12) United States Patent
Becker et al.

(10) Patent No.: US 10,024,577 B2
(45) Date of Patent: Jul. 17, 2018

(54) SOLAR RADIATION RECEIVER HAVING AN ENTRY WINDOW MADE OF QUARTZ GLASS AND METHOD FOR PRODUCING AN ENTRY WINDOW

(75) Inventors: Klaus Becker, Hanau (DE); Achim Hofmann, Frankfurt am Main (DE); Michael Hünermann, Alzenau (DE); Christian Schenk, Ingelheim (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 1002 days.

(21) Appl. No.: 14/345,233

(22) PCT Filed: Sep. 13, 2012

(86) PCT No.: PCT/EP2012/067927
§ 371 (c)(1),
(2), (4) Date: Jul. 1, 2014

(87) PCT Pub. No.: WO2013/037877
PCT Pub. Date: Mar. 21, 2013

(65) Prior Publication Data
US 2014/0360491 A1  Dec. 11, 2014

(30) Foreign Application Priority Data
Sep. 14, 2011  (DE) .......... 10 2011 113 130

(51) Int. Cl.
*F24J 2/05* (2006.01)
*F24J 2/50* (2006.01)
(Continued)

(52) U.S. Cl.
CPC ........... *F24J 2/05* (2013.01); *C03B 19/09* (2013.01); *C03B 19/095* (2013.01); *C03B 29/02* (2013.01);
(Continued)

(58) Field of Classification Search
CPC ...................... F24J 2/505; F24J 2/05
(Continued)

(56) References Cited

U.S. PATENT DOCUMENTS 3,391,688 A * 7/1968 Dery .......... F24J 2/02
126/680
3,923,381 A * 12/1975 Winston .......... F24J 2/06
126/648
(Continued)

FOREIGN PATENT DOCUMENTS

DE 100 20 322 A1 11/2001
DE 102 13 539 A1 10/2002
(Continued)

OTHER PUBLICATIONS

Espacenet English language abstract of DE 10020322 A1, published Nov. 15, 2001.
(Continued)

*Primary Examiner* — Steven B McAllister
*Assistant Examiner* — Steven Anderson, II
(74) *Attorney, Agent, or Firm* — Tiajoloff & Kelly LLP

(57) ABSTRACT

Common solar radiation receivers are equipped with a chamber for transmission of an operating gas which is directed along to an absorber for solar radiation for thermal absorption. The absorber has a dome-shaped entry window made of quartz glass, wherein the inner side facing the absorber assumes a nominal interior temperature Ti of at least 950° C. during proper use, preferably at least 1000° C., whereas the outer side facing away from the absorber is exposed to the environment and subject to risk of devitrification. The invention relates to modifying the known solar radiation receiver so that a high absorber temperature can be set and thus a high efficiency of the solar thermal heating is
(Continued)

enabled, without increasing the risk of devitrification in the region of the outer side of the entry window.

9 Claims, 3 Drawing Sheets

(51) Int. Cl.
  *C03B 19/09* (2006.01)
  *C03B 29/02* (2006.01)
  *C03C 3/06* (2006.01)
  *C03C 4/08* (2006.01)
  *F24J 2/07* (2006.01)

(52) U.S. Cl.
  CPC .................. *C03C 3/06* (2013.01); *C03C 4/08* (2013.01); *F24J 2/07* (2013.01); *F24J 2/505* (2013.01); *C03B 2201/02* (2013.01); *C03B 2201/04* (2013.01); *F24J 2002/503* (2013.01); *Y02E 10/41* (2013.01)

(58) Field of Classification Search
  USPC .................................................. 126/648, 682
  See application file for complete search history.

(56) References Cited

U.S. PATENT DOCUMENTS

| | | | | |
|---|---|---|---|---|
| 4,003,638 A | * | 1/1977 | Winston | F24J 2/06 126/648 |
| 4,057,048 A | * | 11/1977 | Maine | F24J 2/06 126/648 |
| 4,095,118 A | * | 6/1978 | Rathbun | F24J 2/07 126/569 |
| 4,135,489 A | | 1/1979 | Jarvinen | |
| 4,267,823 A | * | 5/1981 | Bohg | F24J 2/08 126/572 |
| 5,271,086 A | | 12/1993 | Kamiyama et al. | |
| 5,421,322 A | * | 6/1995 | Karni | B01J 19/122 126/680 |
| 6,124,980 A | * | 9/2000 | Cerbell | F24J 2/06 359/665 |
| 7,064,094 B2 | | 6/2006 | Harada et al. | |
| 2003/0040423 A1 | | 2/2003 | Harada et al. | |
| 2004/0116269 A1 | | 6/2004 | Harada et al. | |
| 2011/0220095 A1 | | 9/2011 | Van Der Graaf | |

FOREIGN PATENT DOCUMENTS

| | | | | |
|---|---|---|---|---|
| DE | 102004038602 | * | 12/2005 | ............. C30B 15/10 |
| DE | 10 2008 033 946 B3 | | 9/2009 | |
| DE | 10 2010 008 162 A1 | | 8/2011 | |
| EP | 1 610 073 A2 | | 12/2005 | |
| EP | 2145862 A1 | | 1/2010 | |
| JP | S58-104034 A | | 6/1983 | |
| JP | H05-079695 A | | 3/1993 | |
| JP | 2001-328831 A | | 11/2001 | |
| JP | 2006-056743 A | | 3/2006 | |
| JP | 2007-191392 A | | 8/2007 | |
| JP | 2009-046328 A | | 3/2009 | |
| JP | 2009-283227 A | | 12/2009 | |
| JP | 2010-202515 A | | 9/2010 | |
| WO | 2010-055439 A2 | | 5/2010 | |
| WO | 2010 055439 A2 | | 5/2010 | |
| WO | 2011 101327 A1 | | 8/2011 | |

OTHER PUBLICATIONS

Espacenet English language abstract of WO 2011 101327 A1, published Aug. 25, 2011.
Espacenet English language abstract of EP 1 610 073 A2, published Dec. 28, 2005.
Espacenet English language abstract of DE 102 13 539 A1, published Oct. 24, 2002.
Espacenet English language abstract of EP 2145862 A1, published Jan. 20, 2010.
Espacenet English language abstract of JP 2009-283227(A), published Dec. 3, 2009.
Espacenet English language abstract of JP 2009-046328(A), published Mar. 5, 2009.
Espacenet English language abstract of JP 2007-91392(A), published Aug. 2, 2007.
Espacenet English language abstract of JP 2010-202515(A), published Sep. 16, 2010.
Espacenet English language abstract of JP 2001-328831(A), published Nov. 27, 2001.
Espacenet English language abstract of JP 2006-056743(A), published Mar. 2, 2006.
Espacenet English language abstract of JP H05-79695, published Mar. 30, 1993.
Espacenet English language abstract of JP S58-10434, published Jun. 21, 1983.

* cited by examiner

SOLAR RADIATION RECEIVER HAVING AN ENTRY WINDOW MADE OF QUARTZ GLASS AND METHOD FOR PRODUCING AN ENTRY WINDOW

TECHNICAL BACKGROUND

The present invention refers to a solar radiation receiver comprising a chamber for the purpose of passing a working gas to an absorber for solar radiation for thermal absorption, the absorber being arranged in the chamber and having a dome-shaped window made of quartz glass for solar radiation, the window having an inside which faces the absorber and has a nominal internal temperature Ti of at least 950° C., and an outside which faces away from the absorber and is exposed to an ambient temperature Tu.

Furthermore, the present invention refers to a method for producing a dome-shaped window made of quartz glass.

PRIOR ART

Solar radiation receivers, also called solar receivers, serve the solar thermal production of heat and are used in the industrial sector e.g. for reforming carbonaceous compounds to methane or as "solar thermal power stations" for heating air for driving gas turbines.

In a common version of these systems, windows of quartz glass are provided for separating a space to be heated by concentrated solar radiation from the environment. The solar radiation enters via the window into a so-called absorber which has an operating gas flowing therethrough and which thereby heats up the same in a solar thermal manner to high temperatures.

The window is exposed to high temperature loads. Without any counter-measures, the inside of the window facing the absorber is heated up to about the nominal absorber temperature. It is true that the window outside facing away from the absorber is exposed to the much lower ambient temperature, which is set due to the atmosphere temperature and the solar irradiation. However, due to heat conduction the window outside is also heated up to temperatures of several 100 degrees Celsius.

The high temperature prevailing on the outside of the window may cause the devitrification of the quartz glass, which is promoted by contamination of the surface, e.g. by alkali-containing dusts and aerosols, and by other environmental influences. This crystallization leads to a reduction of the optical transmission up to fracture and, in the final analysis, defines the service life of the window. Maintenance work on a regular basis as well as exchange and repair are logistically complicated and expensive and limit the profitability of the system. Therefore, special attention is paid to the prevention of any devitrifications of the window.

The tendency to crystallization can be reduced by using high-purity, particularly alkali-free quartz glass. Further technical measures aim at keeping the window surface particularly clean, e.g. by frequent intensive cleaning or, if at all possible, by ensuring a particle-free environment, e.g. in cleanrooms.

As an alternative or in addition thereto, the attempt is made to reduce the tendency to crystallization of the window by way of a low temperature, as e.g. in EP 1 610 073 A2, which discloses a solar radiation receiver of the aforementioned type. The absorber is arranged within a chamber and is completed to the outside by a dome-shaped window, the convexly curved surface (the "dome") of the window projecting into the absorber interior. Due to its dome-shaped configuration the back reflection of radiation out of the absorber is reduced.

To keep the temperature of the window below 800° C. to 850° C., it is suggested that the window should be shielded against the infrared radiation of the absorber by means of an infrared radiation shield. Preferably, the infrared radiation shield is made of infrared radiation-absorbing quartz glass. In addition, the inside of the window is force-cooled by means of a guided air flow.

The shielding from the infrared radiation by the infrared radiation shield may however reduce the energy absorption of the operating gas and produce efficiency losses. A forced cooling is constructionally complicated and requires additional energy efforts for producing the air flow. Hence, these measures may reduce the efficiency of the solar thermal heating on the whole.

WO 2010/055439 A2 describes a solar radiation receiver without any active cooling of the radiation window of the absorber. Instead, it is suggested that the radiation window should be made from a quartz glass which emits IR radiation particularly strongly. The desired IR emission of the quartz glass is to effect a cooling of the window. This is achieved by a high content of hydroxyl groups (OH groups), the content being preferably at least 600 wt. ppm.

It is true that hydroxyl groups in quartz glass exhibit a pronounced absorption or emission, respectively, in a small section of the infrared wavelength spectrum of about 2680 nm to 2800 nm. However, quartz glass that is poor in hydroxyl groups is also partly opaque in the rather long-wave infrared spectral range, so that the supplementary absorption by hydroxyl groups entails a rather small additional cooling effect. Moreover, with the hydroxyl group content of the quartz glass the tendency of the quartz glass to crystallization is increasing.

The windows are often dome-shaped, also in the above-mentioned prior art. Such dome-shaped windows of quartz glass are produced by way of glass blowing methods. The starting point is for instance a quartz glass tube which is inflated and thereby shaped into a more thin-walled hollow body. On account of the deformation properties of quartz glass and its high viscosity (also at sublimation temperature of $SiO_2$) the desired end shape can normally not be achieved in a direct way, and one must often dismantle the hollow body into sub-pieces and assemble the same anew so as to obtain a preform with an approximate geometry of the window. The sub-pieces are here welded and the preform obtained in this way is annealed after mechanical finishing in a final way at a high temperature so as to reduce mechanical stresses.

A dome-shaped component of quartz glass of a high optical quality is thereby obtained. It is however evident that with this manufacturing method and despite the great amount of time and energy spent it is only possible to produce unique pieces of low reproducibility as regards their geometrical and mechanical properties.

DE 102 13 539 A1 describes several production methods for opaque to transparent doped quartz glass for components in semiconductor production. Feedstock powders of $SiO_2$ and the dopant are here built up in layers and directly vitrified. For instance, the feedstock powders are continuously introduced or spread into a rotating metallic melt mold and directly vitrified by means of plasma burners. Ingots of the doped quartz glass are thereby obtained.

DE 10 2008 033 946 B3 describes a standard vacuum-type melting method for producing quartz glass crucibles. Two $SiO_2$ grain layers of quartz sand and of synthetic granules, respectively, each having a thickness of 12 mm, are built up in layers on the inner wall of a metallic melt mold one after the other, and these grain layers are sintered by means of plasma and under vacuum. The inner grain layer is here sintered into an inner layer of transparent quartz glass; the outer grain layer into opaque quartz glass. The result is a quartz glass crucible with opaque outer wall and an inner layer of transparent quartz glass.

TECHNICAL OBJECT

As a rule, the efficiency of the energy conversion in the solar radiation receiver is increasing with the absorber temperature (outlet temperature). Therefore, very high absorber temperatures are actually aimed at. On the other hand, the windows must show a high long-term stability to permit a reasonable use in solar radiation receivers. As for windows made of quartz glass, the above-mentioned devitrification of the outside which is exposed to environmental influences is here particularly critical. Since such crystallizations occur more and more at temperatures above a limit temperature that is in the range of about 800° C. to not more than 850° C., this limit temperature on the outside of the window limits the possible absorber temperatures.

It is the object of the present invention to provide a solar radiation receiver that has an window made of quartz glass, on which a high absorber temperature can be set and which thus enables a high efficiency of the solar thermal heating, without increasing the risk of devitrification in the region of the outside of the window.

Moreover, it is the object of the present invention to indicate a method by means of which a dome-shaped window, particularly for the solar radiation receiver according to the invention, can be produced with high dimensional stability at low costs and in a reproducible manner.

GENERAL DESCRIPTION OF THE INVENTION

As for the solar radiation receiver, this object starting from a solar radiation receiver of the aforementioned kind is achieved according to the invention in that the window has a wall thickness d which is configured in response to Ti and Tu such that in the area of the window outside a temperature Ta of less than 850° C. is obtained, with the additional provisions that the temperature difference Ti–Ta is at least 150° C. and the wall thickness d in the region of a maximum of the internal temperature Ti is at least 7 mm.

When the solar radiation receiver is used, the window is predominantly heated up from the absorber side. Due to heat conduction in the window and heat transfer on the window outside towards the environment a stationary temperature distribution is obtained.

The invention aims at limiting the heating up of the outside of the window at the non-process and atmosphere side by way of the thickness of the window wall. In the modification according to the invention of the formerly known windows, the window thickness is therefore configured such that a temperature gradient which effects a temperature difference Ti–Ta of 150° C. or more across the window thickness is set over the window wall from the hot inside, so that a temperature below 850° C. is achieved at any rate in the thermal stationary equilibrium on the cooler outside. As for the adjustment of the temperature Ta in the stationary equilibrium, the wall thickness d yields an additional degree of freedom that has so far not been paid attention to. In other words, due to the freedom in adjusting the temperature gradient, the temperature Ta of the window outside is decoupled from the temperature Ti on the window inside facing the absorber, so that it can remain at any rate below 850° C. This leads to a certain insensitivity of the outside to crystallization. On the other hand, the said decoupling also permits comparatively higher temperatures on the window inside, thereby leading to a higher efficiency of the energy conversion, in that due to a greater window thickness the temperature difference required in the given case is produced and a flat temperature gradient, and it is thereby not possible to exceed the limit temperature on the window outside. Moreover, a flatter temperature gradient also leads to a smaller heat dissipation across the window and thus to a lower energy loss.

The higher the nominal temperature of the absorber, the greater is the necessary wall thickness of the window. The high-purity quartz glass suited for this is however expensive and, due to its great wall thickness, additional transmission losses of the solar radiation must be put up with. These drawbacks, however, are compensated by the increased insensitivity of the outside to crystallization and the accompanying longer service life of the window and the smaller efforts needed for maintenance and exchange. The cooling measures known from the prior art, such as active air cooling or a shielding of the window against infrared radiation, can be omitted.

Hence, the modification of the prior art according to the invention permits the setting of a high absorber temperature and thus a high efficiency of the solar thermal heating without increasing the risk of devitrification in the region of the outside of the window.

The minimum thickness of the window substantially depends on the temperature Ti on the window inside. This temperature is normally known or can be determined and is at least 950° C. In the case of a uniform temperature distribution across the window inside, this temperature simultaneously corresponds to the "maximum" of the internal temperature Ti. However, during the intended use of the solar radiation receiver, an inhomogeneous curve of the temperature Ti over the inside of the window may occur, e.g. with a maximum in the central region of the incident solar radiation.

In the simplest case the window has a uniform thickness. In the case of a non-uniform thickness, value and position of the minimum thickness depend on the temperature maximum on the window inside.

With respect to a crystallization tendency of the window outside that is as low as possible, it has turned out to be useful when the window has a wall thickness d which is configured in response to Ti and Tu such that in the area of the outside a temperature Ta of less than 800° C., preferably less than 750° C., is obtained.

Here, "Tu" represents the ambient temperature prevailing outside the solar radiation receiver, which in the simplest case can be assumed to be the standard room temperature (=25° C.).

Preferably, the wall thickness d is at least 10 mm, particularly preferably at least 20 mm, in the region of the maximum internal temperature Ti.

At the given maximum temperature Ti in the region of the window inside, the temperature Ta in the area of the outside is the lower the greater the wall thickness d is. On the other hand, at a given temperature Ta in the area of the outside, a greater wall thickness of the window permits a correspondingly higher absorber temperature Ti on the inside, thereby enabling a higher efficiency of the solar radiation receiver.

A suitable thickness d of the window can be determined by way of tests. For an estimation, it has turned out to be useful when the wall thickness d in the region of the maximum internal temperature Ti is configured on the basis of the following dimensioning rule:

$$d > \lambda(Ti-Ta)/\alpha(Ta-Tu) \quad (1),$$

where: $\lambda$=heat conduction coefficient of transparent quartz glass, and
$\alpha$=heat transfer coefficient quartz glass/air during convection As regards the heat conduction coefficient of transparent quartz glass, the literature mentions a value $\lambda=1.4$ W/(m·K). The heat transfer coefficient quartz glass/air depends on the flow rate of the air. At a flow rate of 10 m/s one obtains a value of $\alpha=36$ W/(m²·K), which is suited for estimating the wall thickness according to equation (1).

The ambient temperature "Tu" is roughly a standard room temperature. "Ta" follows from the specific demands made on non-crystallization and the service life of the window and is not more than 850° C. The temperature "Ti" on the window inside roughly corresponds to the absorber temperature, with the additional proviso that it is by at least 150° C. higher than Ta. Where Ta=850° C., Ti≥1000° C.

This dimensioning rule becomes apparent from the following considerations:

The window is primarily heated up by contact with the hot air in the absorber. A further heat source is the heat radiation of the absorber which impinges on the window. Due to the spectral profile of this heat radiation it is partly absorbed in the window so that the same is heated. The comparatively greater thickness of the window reduces the energy loss by heat conduction and by heat radiation.

As a first approximation, in the stationary state the same heat amount that is transported by heat conduction through the window passes on the outer wall to the environment. The equation for the heat conduction and the equation for the heat transfer can thereby be equated, so that $$\frac{dQ}{dt} = \frac{\lambda}{d}(T_i - T_a) = \alpha * (T_a - T_u) \quad (2)$$

The above dimensioning rule according to equation (1) is obtained by way of a rearrangement. With an increasing window thickness d the heat conduction across the window is slightly decreasing, whereby the heat loss of the absorber is reduced. The temperature Ta on the window outside is significantly decreasing with greater wall thicknesses. Starting from a wall thickness corresponding to more than two times the quotient of equation (1), more and more drawbacks in terms of weight, costs and optical transmission are observed; these are no longer sufficiently compensated by the advantage of the lower temperature Ta.

As a rule, the temperature curve over the inside shows a maximum in the center of the window. Especially with respect to this, an embodiment of the solar radiation receiver has turned out to be useful in which the wall thickness d of the window has a maximum in the area of a dome center.

The wall of the window does not show a uniform wall thickness profile, but shows an inhomogeneous wall thickness profile with a maximum in the area of the dome center, which in the simplest case corresponds to that approximately in the window center. The aforementioned drawbacks of the thick-walled window with respect to material costs and transmission losses are thereby minimized.

In this respect it has turned out to be useful when the wall thickness is greater in the maximum by at least 20%, preferably by at least 50%, than in the region of a minimum.

Especially with respect to a low crystallization tendency, the quartz glass of the window has a mean hydroxyl group content of less than 100 ppm by wt., preferably of less than 30 ppm by wt.

As for the method for producing such a dome-shaped window of quartz glass, particularly for a solar radiation receiver, the aforementioned technical object is achieved according to the invention by a method comprising the following method steps:

(a) providing a dome-shaped melt mold with porous wall.
(b) introducing $SiO_2$ granules into the melt mold and forming a dome-shaped $SiO_2$ grain layer with a thickness of at least 12 mm on the inner wall of the melt mold,
(c) densifying the $SiO_2$ grain layer under action of a plasma and by applying a negative pressure acting from the outside through the porous wall on the grain layer so as to form a blank of the window,
(d) mechanically removing an outer portion of the blank so as to form a preform of the window, and
(e) mechanically or thermally polishing the preform to obtain the window of transparent quartz glass.

The method according to the invention permits the production of a one-piece window of quartz glass without welds in dome shape, e.g. in the form of a spherical segment, a hyperboloid or an elliptic paraboloid.

In contrast to the former method, the method according to the invention does not start from prefabricated quartz-glass components, but from $SiO_2$ granules which are formed in a molding and vitrifying method directly into a preform with the approximate dimensions of the dome-shaped window. Further forming steps, such as an inflating of tubes, a joining of parts, or the like, are not needed.

Especially because of the low heat conducting capacity of quartz glass, the reproducible production of rather thick-walled curved quartz glass components is difficult. The method according to the invention eliminates these problems. The use of the melt mold and the formation of the $SiO_2$ grain layer on the inside thereof ensure a reproducible shaping. For instance, the inside of the $SiO_2$ grain layer forms the inside of the dome-shaped window after densification, vitrification and possible cleaning steps.

The introduction of the $SiO_2$ granules into the melt mold is e.g. carried out by using a template by means of which the granules are pressed onto the inner wall of the melt mold rotating about its central axis and/or under the action of gravitation in the case of a rotating melt mold. The grain layer is applied either directly onto the inner wall of the melt mold or onto the inner wall of a quartz glass layer already provided there. The template is formed such that the desired layer thickness distribution of the grain layer is obtained; in the simplest case, a uniform layer thickness of the grain layer is produced. As an alternative thereto, the $SiO_2$ granules may also be introduced or spread into the melt mold and simultaneously be softened under the action of the plasma and flung against the inner wall of the melt mold.

The thickness of the $SiO_2$ grain layer is composed of a portion that yields the desired wall thickness of the window plus a possible allowance, and of a further portion which remains as a residual layer in the melt mold upon removal of the blank. It is important for the production of the thick-walled window according to the invention that the grain layer has a correspondingly great thickness so that in consideration of the bulk density or the compacted bulk density of the grain layer one obtains a minimum thickness of the window of 7 mm after vitrification and possible removal by mechanical finishing. To ensure this, a grain layer is produced according to the invention that—at least in the area from which in the finished window the minimum wall thickness of 7 mm, preferably at least 10 mm, and particularly preferably at least 20 mm is to be produced— has a layer thickness of 12 mm or more, preferably 20 mm or more.

Vitrification of the $SiO_2$ grain layer takes place starting from its inside. It can additionally be vitrified starting from its outside. During vitrification from the inside (here also called "densification"), use is made of a plasma which is introduced into the interior of the melt mold and by means of which the grain layer is heated to a high temperature. A melt front is here gradually migrating from the inside of the $SiO_2$ grain layer to the outside. The densification process is normally interrupted before this melt front has reached the inner wall of the melt mold.

Since particulate $SiO_2$ is started from, a special challenge in the method according to the invention must be seen in the vitrification of the $SiO_2$ granules into transparent quartz glass. This is considerably promoted by the application of a negative pressure during densification of the $SiO_2$ grain layer, the negative pressure removing gases via the gas-permeable melt mold wall from the grain layer, which gases might otherwise lead to the formation of bubbles.

This yields a dome-shaped blank of quartz glass which is substantially without bubbles on its inside and which comprises more and more pores towards the outside. This blank is not yet suited for an application where high demands are made on the optical transmission.

The outer region of the blank that is not completely densified is removed mechanically to such an extent that a preform is obtained which substantially already shows the shape and the desired dimensions of the window, particularly the intended wall thickness and contour. Since the quartz glass which is removed in this process is not completely densified, relatively low energy expenditure is sufficient for the removal. However, the preform obtained thereby still includes rough outer regions and is therefore smoothed mechanically or thermally—by fire polishing—in a subsequent step. During polishing the dimensions of the preform are hardly changed.

An window of transparent quartz glass is thereby producible particularly for a solar absorber with a high dimensional stability at low costs and in a reproducible manner.

In a preferred method variant, the densification of the $SiO_2$ grain layer according to method step (c) comprises a two-stage process, with a first process stage in which an inner portion of the $SiO_2$ grain layer is densified and a lower negative pressure is applied, and with a second process stage in which a higher negative pressure is applied and the $SiO_2$ grain layer is further densified.

Due to its relatively high sinter activity the densification of the $SiO_2$ granules already starts at an early stage. A dense "sealing layer" with a defined thin wall thickness on a continuous porous substrate is thereby produced on the inside of the grain layer. After formation of the dense "sealing layer" the intensity of the negative pressure is increased, so that gases are removed from the still porous region of the grain layer, and in the second heating stage this region of the grain layer is then densified at an elevated temperature.

For the production of an window with an inhomogeneous wall thickness curve, a procedure has turned out to be useful wherein during densification of the $SiO_2$ grain layer according to method step (c) a dome-shaped blank is formed that in the area of a dome center has a maximum of its wall thickness that is greater by at least 20%, preferably by at least 50%, than in the region of a minimum wall thickness.

During mechanical removal of the outer portion of the blank a preform is preferably produced with a dome-shaped outside corresponding to the inside and with a maximum wall thickness in the range of at least 7 mm, preferably at least 10 mm and particularly preferably at least 20 mm.

It has turned out to be useful when the polishing operation for the preform for obtaining the window of transparent quartz glass is carried out by heating to a temperature of at least 1600° C. by means of a burner with combustion flame.

The surface area of the previously mechanically treated preform, which area is still rough, is here heated from the outside by means of a burner or a plurality of burners in that a fuel, such as hydrogen, acetylene or propane, is burnt with oxygen. With the help of such a burner locally high temperatures can be produced that are adequate for the transparent sintering of the still rough part of the preform without any significant deformations occurring. Temperature and heating duration during vitrification are set such the quartz glass after vitrification shows a high internal transmission of at least 95% (based on a layer thickness of 1 mm) in the wavelength range between 300 nm and 2400 nm.

A high transparency is also promoted by a preferred method variant which uses a melt mold in which the gas-permeable wall consists of graphite, and in which the densification of the $SiO_2$ grain layer according to method step (c) is carried out in a helium- and/or hydrogen-containing atmosphere.

The melt mold has a gas-permeable wall which consists e.g. of porous graphite. As an alternative or in addition thereto, the wall is provided with a plurality of through holes. The material graphite facilitates, on the one hand, the removal of the blank after solidification, and the graphite wall can particularly easily be produced in a porous form or provided with through holes.

Helium and hydrogen belong to the gases rapidly diffusing in quartz glass. An exchange of the air normally existing in the grain layer by means of said gases will reduce both bubble formation and bubble growth in the grain layer during densification and vitrification.

The $SiO_2$ grain layer is here preferably densified in an open-flow system, wherein helium and/or hydrogen of the melt mold is continuously supplied as a controlled gas stream. The open-flow system permits not only a gas flow within the melt mold, but also enables a gas flow directed out of the melt flow. This facilitates the discharge of contaminated gas or vaporized material from the melt mold. Undesired deposits are thus excluded and contaminations are reduced.

In this connection it has also turned out to be useful when a gas enrichment of the $SiO_2$ grain layer is provided between the method step of shaping a $SiO_2$ grain layer and the method step regarding densification, wherein the atmosphere in the melt mold is enriched by the atmosphere containing helium and/or hydrogen.

Due to this gas enrichment prior to the densification of the grain layer the content of air or nitrogen, respectively) is reduced in the layer, so that the use of the relatively expensive gases helium and/or hydrogen during densification is more efficient and the layer produced thereby shows a particularly low bubble density.

EMBODIMENT

The invention will now be explained in more detail with reference to embodiments and a drawing. FIGS. 1 to 4 schematically illustrate method steps in performing the method according to the invention for producing a paraboloid-shaped window of quartz glass for a solar radiation receiver according to the invention. In detail:

Figure 1:
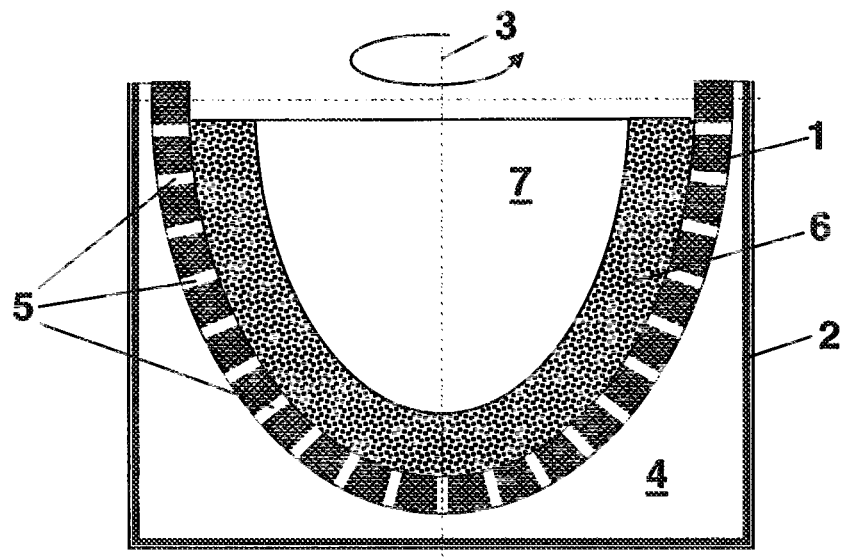
FIG. 1 shows the formation of a $SiO_2$ grain layer in a melt mold.

FIG. 1 shows a melt mold 1 of graphite having a maximum inner diameter of 100 cm, which is positioned with an outer flange on a carrier 2 which is rotatable about a central axis 3. The space 4 between melt mold 1 and carrier 2 can be evacuated. The melt mold wall has a multitude of passages 5 through which a vacuum applied to the outside of the melt mold 1 can act on the interior 7.

In a first method step, crystalline granules of natural high-purity quartz powder are filled into the melt mold 1 rotating about its longitudinal axis 3. The quartz powder has a multimodal particle size distribution with a main maximum of the particle sizes in the range of 50-120 µm, the mean particle size being about 85 µm, and with a secondary maximum of the particle size distribution at a particle size of about 1 µm. Under the action of a centrifugal force and by means of a template, a rotation-symmetrical paraboloid-shaped layer 6 of mechanically compacted quartz sand is formed on the inner wall of the melt mold 1. The mean layer thickness of the layer 6 is 18 mm.

In a second method step, the air contained in the grain layer 6 is enriched with a helium-containing process gas. To this end the air within the melt mold 1 is sucked off via the gas-permeable grain layer 6 to the outside, and a mixture of helium and 20% oxygen is simultaneously introduced into the interior 7 of the melt mold 1. The open upper side of the melt mold 1 is here partly covered with a heat shield 11 (see FIG. 2) while leaving a vent gap 12. After a period of about 10 minutes the enrichment with the helium-containing process gas is terminated.

Figure 2:
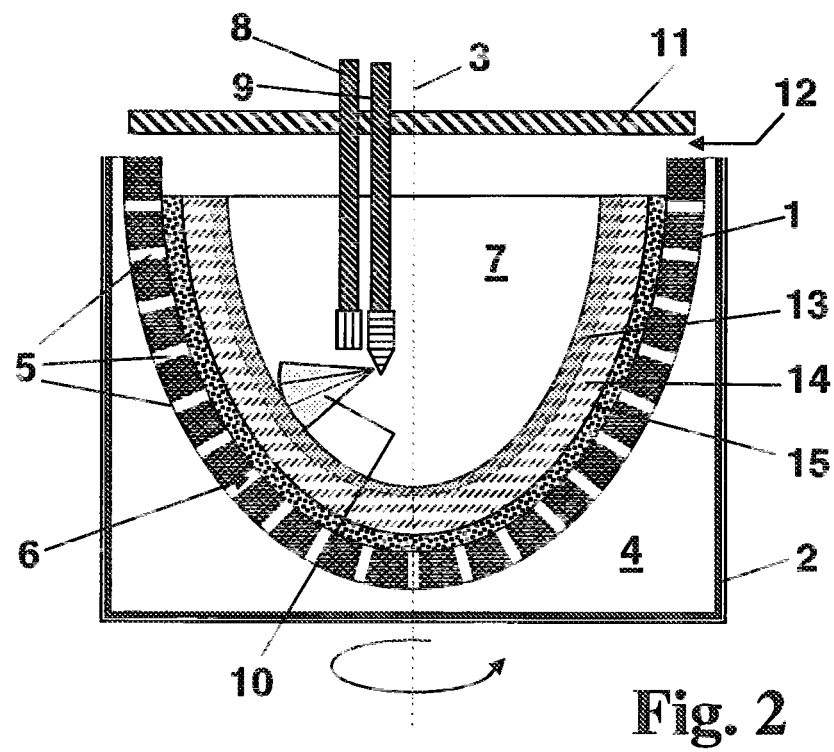
FIG. 2 shows the densification of the $SiO_2$ grain layer by means of plasma.

In a further method step, which is schematically shown in FIG. 2, the $SiO_2$ grain layer 6 is densified zone by zone. To this end, after completion of the gas enrichment process, electrodes 8; 9 are introduced into the interior 7, and an electric arc, which is marked in FIG. 2 by the plasma zone 10 as a gray-shaded region, is ignited between the electrodes 8; 9 in the melt mold atmosphere consisting of helium and oxygen. In this process a constant and regulated flow of the $He/O_2$ mixture of 300 l/min is further supplied to the interior 7, so that within the interior 7 a stable gas flow is formed between the gas inlet (not shown) in the heat shield 11 and the vent gap 12.

Densification of the grain layer 6 is carried out in a two-stage process. In the first stage the electrodes 8; 9 are moved into a central position of the interior 7 and acted upon with a power of about 270 kW (200 V, 1350 A). The heat thereby generated in the interior 7 in combination with the process gas ($80He/20O_2$) is enough for sintering the sinter-active particles of the grain layer 6, so that a thin, but dense sealing layer is formed over the whole inside thereof, the sealing layer separating non-molten portions of the grain layer 6 from the atmosphere in the melt mold interior 7.

As soon as the sealing layer has been formed, the second vitrification step will begin. Due to the continued pumping action via the vacuum device, a negative pressure of about 200 mbar (absolute) is generated in the still unvitrified portion of the grain layer 6. The electrodes 8; 9 are now acted upon with a power of 600 kW (300 V, 2000 A) and moved into the vicinity of the inner wall and lowered downwards. It is thereby ensured that the inner portions of the grain layer 6 are reached with the plasma zone 10 and also with the process gas ($80He/20O_2$). In this process a melt front is migrating from the inside to the outside, so that a portion of transparent, low-bubble quartz glass is obtained on the inside of the grain layer 6, as is outlined by way of the gray-shaded surface area 13. The thin and non-transparent sealing layer which covers the transparent inner portion 13 is at least partly removed in the further course of the process by the action of the plasma 10 and, if necessary, fully eliminated at the end of the production process by way of sandblasting.

As soon as the transparent, vitrified inner portion 13 has reached a thickness of about 11 mm and before the melt front reaches the inner wall of the melt mold 1, the densification process starting from the inside of the $SiO_2$ grain layer will be terminated. The adjacent portion 14 of the original grain layer 6, which is positioned further to the outside, is here densified into a porous quartz glass, whereas the outermost layer 15 of the original grain layer 6 remains undensified.

Figure 3:
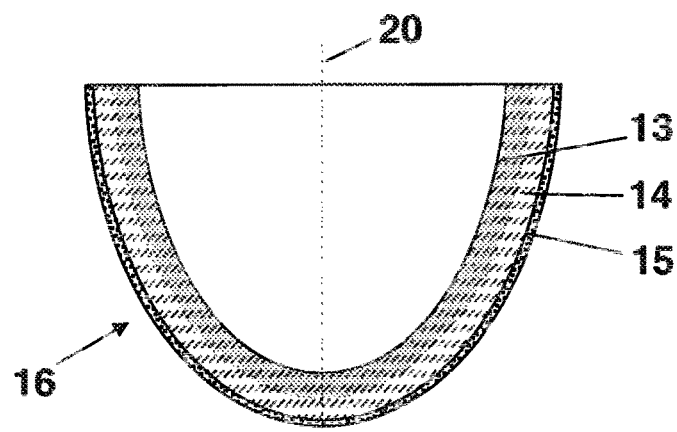
FIG. 3 shows a densified preform for the window after demolding and after grinding the outside.

After removal from the melt mold 1 the dome-shaped blank 16 of the window, which is schematically shown in FIG. 3, is thus obtained. In the blank 16, the inner portion is formed by a smooth, vitreous and low-bubble inner layer 14 with a thickness of 11 mm of quartz glass, which is firmly bonded to an outer portion 14 of bubble-containing quartz glass to which partly still undensified granules 15 are adhering. The adhering granules 15 are removed by sandblasting. The bubble-containing outer portion 14 is fully ground off, resulting in a dome-shaped preform 17 (see FIG. 4) of quartz glass with a uniform wall thickness of about 11 mm with an inner portion 13 of transparent quartz glass.

Figure 4:
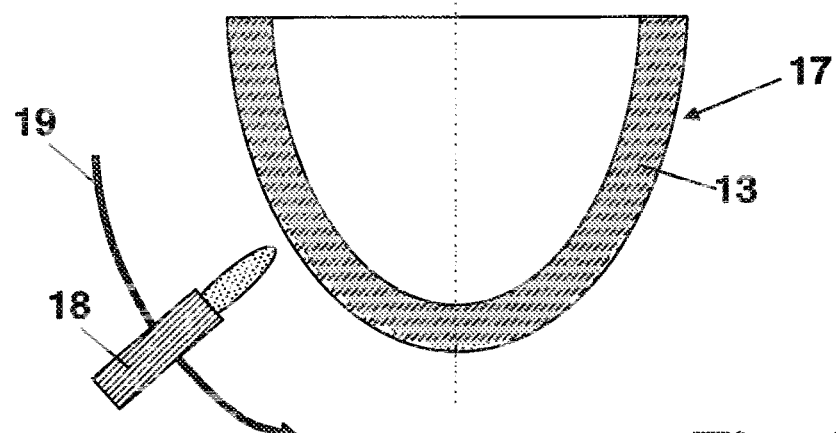
FIG. 4 shows the generation of a transparent wall of the preform by heating by means of a burner.

As schematically shown in FIG. 4, the outer surface of the preform 17 which is still rough despite the grinding process is subsequently fire-polished. An oxyhydrogen burner 18 is guided along the outer wall of the preform 17 which is rotating about its longitudinal axis 20 (as outlined by the directional arrow 19), whereby the outer wall is locally heated to high temperatures of more than 2000° C. The rough outer surface is here fused without the transparent portion 13 of the preform being softened and significantly deformed in this process.

As an alternative to this fire polishing process, the rough outer surface is smoothed by mechanical polishing and honing. The outer wall of the preform 17 is here processed by means of a honing machine, the degree of polish being continuously refined by exchanging the honing stone retainers. The final treatment is carried out with a #800 honing stone with a removal of about 60 µm.

Figure 5:
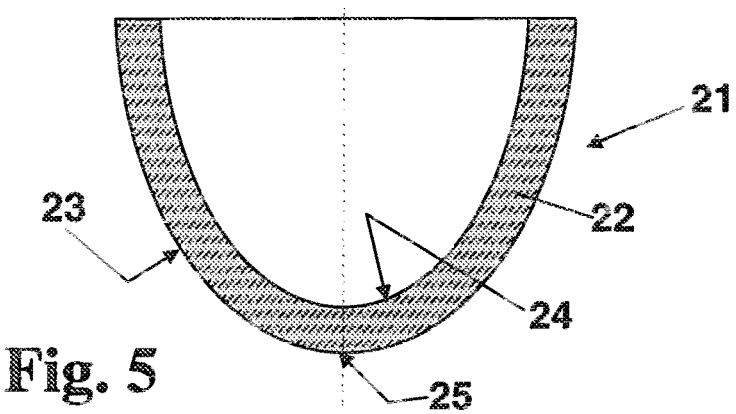
FIG. 5 shows the window obtained according to the method.

After vitrification one obtains the dome-shaped window 2 of fully transparent quartz glass, as schematically shown in FIG. 5; it has a wall 22 with a uniform wall thickness of about 11 mm. The quartz glass of the window 21 has a mean hydroxyl group content of less than 50 ppm by wt. and an internal transmission of more than 95% (based on a layer thickness of 1 mm) in the wavelength range of 300-2400 nm. In the installed state the inside 23 is facing the absorber of the solar radiation receiver according to the invention and the outside 24 is exposed to the environment. The dome center of the window 21 or the apex of the dome is designated by reference numeral 25.

Figure 6:
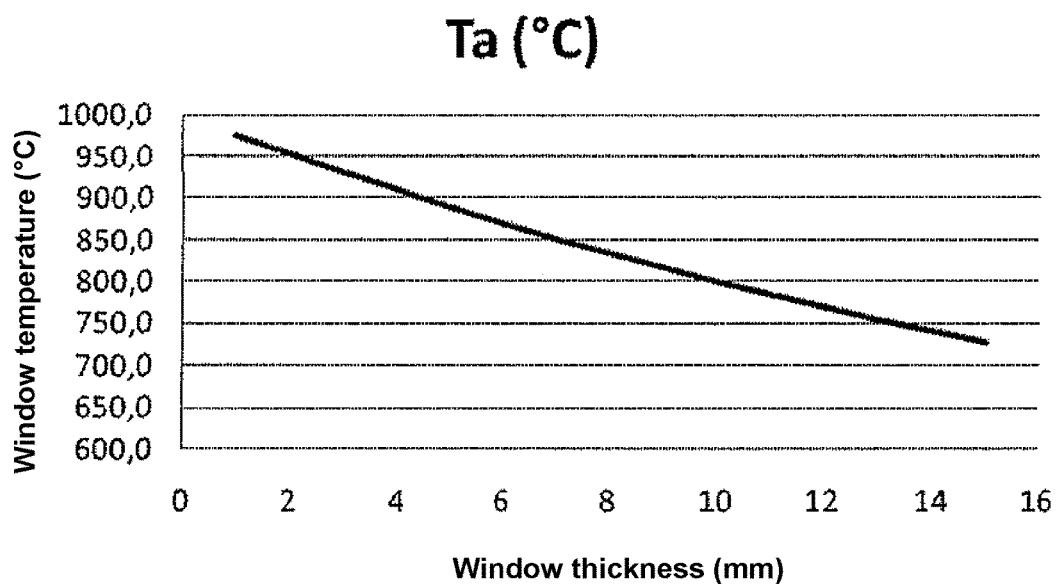
FIG. 6 shows a diagram for determining the necessary minimum wall thickness of the window in response to the nominal absorber temperature.

In the diagram of FIG. 6, in the case of an absorber temperature Ti of 1000° C. the temperature Ta in [° C.] on the outside 24 of the window 21 is plotted on the y-axis against the wall thickness d in [mm].

As a consequence, a maximum temperature of about 870° C. is obtained in the case of an window 21 having a wall thickness of 6 mm that is approximately within the range of the wall thicknesses that have so far been standard. In the case of a window wall thickness of 11 mm, as in the above embodiment, a temperature gradient of about 220° C. is formed over the window wall, so that the temperature on the outside 24 is only 770° C. This difference of about 100° C. in comparison with the standard wall thickness may be decisive for the long-term stability of the window.

Inversely, a particularly thick-walled window 21 with a wall thickness of 11 mm (and more) at a given maximum temperature of e.g. 850° C. on the outside 24 permits process temperatures on the window inside 23 that are hotter by about 100° C., which considerably improves the efficiency of the conversion into electrical energy.

Figure 7:
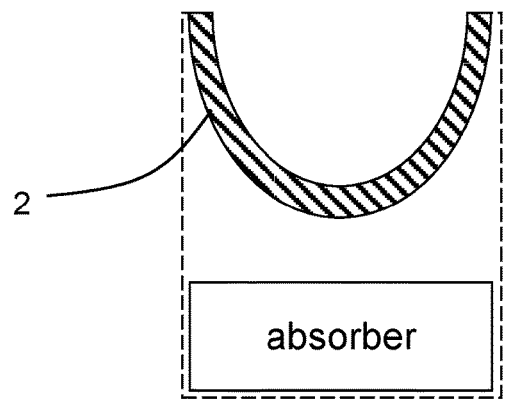
FIG. 7 shows a diagram showing a solar-radiation receiver according to the invention.

FIG. 7 shows the dome-shaped window 2 installed in a chamber with an absorber in a solar-radiation receiver of known configuration.

The invention claimed is:

1. A solar radiation receiver comprising:
a chamber configured to pass a working gas to an absorber for solar radiation so as to cause thermal absorption;
the absorber being supported in the chamber and
a dome-shaped window of quartz glass transmitting solar radiation has a convexly curved inside surface that faces the absorber, and an outside that faces away from the absorber and is exposed during operation of the receiver to an ambient temperature Tu,
wherein the window has a wall thickness d such that, when the convexly curved inside surface has a nominal internal temperature Ti of at least 950° C. during operation of the receiver, the outside of the window has a temperature Ta that is less than 850° C. and at least 150° C. less than the nominal internal temperature Ti, and
wherein the window has a region wherein the internal temperature Ti is a maximum internal temperature Ti of the window during operation of the receiver, and the wall thickness d in the region of said maximum internal temperature Ti is at least 7 mm;
wherein the wall thickness d has a maximum in a dome center of the window; and
wherein the wall thickness d varies from a minimum thickness to a maximum thickness, and said maximum thickness is greater than the minimum thickness by at least 20%.

2. The solar radiation receiver according to claim 1, wherein the wall thickness d is configured such that, when during operation of the receiver the internal temperature Ti is at least 950° C., the temperature Ta of the outside is less than 800° C.

3. The solar radiation receiver according to claim 1, wherein the wall thickness d is at least 10 mm in the region of the maximum internal temperature Ti.

4. The solar radiation receiver according to claim 1, wherein the wall thickness d in the region of the maximum internal temperature Ti is configured such that, when the internal temperature Ti is at least 950° C. during operation of the receiver, the wall thickness in said region conforms to the following dimensioning rule:

$$d > \lambda(Ti-Ta)/\alpha(Ta-Tu) \quad (1),$$

where:
$\lambda$ = a heat conduction coefficient of transparent quartz glass;
$\alpha$ = a heat transfer coefficient quartz glass/air; and
Tu=25° C.

5. The solar radiation receiver according to claim 1, wherein the quartz glass of the window has a mean hydroxyl group content of less than 100 ppm by wt.

6. The solar radiation receiver according to claim 1, wherein the wall thickness d is configured such that, when during operation of the receiver the internal temperature Ti is at least 950° C., the outside has a temperature Ta of less than 750° C.

7. The solar radiation receiver according to claim 1, wherein the wall thickness d is at least 20 mm in the region of the maximum internal temperature Ti.

8. The solar radiation receiver according to claim 1, wherein the wall thickness varies from a minimum thickness to a maximum thickness, and said maximum thickness is greater than the minimum thickness by at least 50%.

9. The solar radiation receiver according to claim 1, wherein the quartz glass of the window has a mean hydroxyl group content of less than 30 ppm by wt.

* * * * *